(12) United States Patent
Gemmati et al.

(10) Patent No.: US 10,196,130 B2
(45) Date of Patent: Feb. 5, 2019

(54) ADJUSTABLE AND ROTARY RUDDER BAR FOR A ROTARY WING AIRCRAFT

(71) Applicant: AIRBUS HELICOPTERS, Marignane (FR)

(72) Inventors: Bernard Gemmati, Lauris (FR); Florian Feugas, Chateauneuf les Martigues (FR); Christophe Pujol, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 380 days.

(21) Appl. No.: 15/219,418

(22) Filed: Jul. 26, 2016

(65) Prior Publication Data

US 2017/0029092 A1 Feb. 2, 2017

(30) Foreign Application Priority Data

Jul. 27, 2015 (FR) ...................................... 15 01599

(51) Int. Cl.
*B64C 13/06* (2006.01)
*B64C 9/02* (2006.01)
*B64C 13/30* (2006.01)

(52) U.S. Cl.
CPC ................ *B64C 13/06* (2013.01); *B64C 9/02* (2013.01); *B64C 13/30* (2013.01)

(58) Field of Classification Search
CPC .............................. B64C 13/06; B64C 13/044
See application file for complete search history.

(56) References Cited

U.S. PATENT DOCUMENTS

| 2,478,882 | A | | 8/1949 | Wells | |
|---|---|---|---|---|---|
| 3,129,605 | A | * | 4/1964 | Bonnell, Jr. | ............ B64C 13/06 104/196 |
| 3,209,612 | A | * | 10/1965 | Tonnies | ................... B64C 13/00 244/234 |
| 3,377,881 | A | | 4/1968 | Lucas | |
| 4,484,722 | A | | 11/1984 | Larson et al. | |
| 5,130,650 | A | | 7/1992 | Lemarquand | |
| 7,690,604 | B2 | * | 4/2010 | Christensen | ............ B64C 13/06 244/220 |
| 9,261,894 | B2 | * | 2/2016 | Stachniak | ............... B64C 13/06 |
| 2008/0105790 | A1 | | 5/2008 | Christensen et al. | |

(Continued)

FOREIGN PATENT DOCUMENTS

FR 2660028 9/1991
GB 302137 12/1928

OTHER PUBLICATIONS

French Search Report for French Application No. FR 1501599, Completed by the French Patent Office, dated May 12, 2016, 6 Pages.

*Primary Examiner* — Brian M O'Hara
(74) *Attorney, Agent, or Firm* — Brooks Kushman P.C.

(57) ABSTRACT

An adjustable and rotary rudder bar for a rotary wing aircraft. The rudder bar comprises a pedal bar, a main body, two pedals connected to the pedal bar on either side of the main body, a slider device enabling the pedal bar to slide relative to the main body, a structure fastened to a floor of the aircraft, and a shaft having a first axis (A1). The shaft is secured to the main body, and the main body is movable in turning relative to the structure about the first axis (A1) thus causing the main body, the pedal bar, and the pedals to turn simultaneously.

13 Claims, 4 Drawing Sheets

(56) References Cited

U.S. PATENT DOCUMENTS

| | | |
|---|---|---|
| 2013/0019706 A1 | 1/2013 | Cronin et al. |
| 2014/0131523 A1 | 5/2014 | Carner et al. |
| 2014/0251066 A1 | 9/2014 | Stachniak |
| 2017/0166296 A1* | 6/2017 | Guering .................. B64C 13/04 |

\* cited by examiner

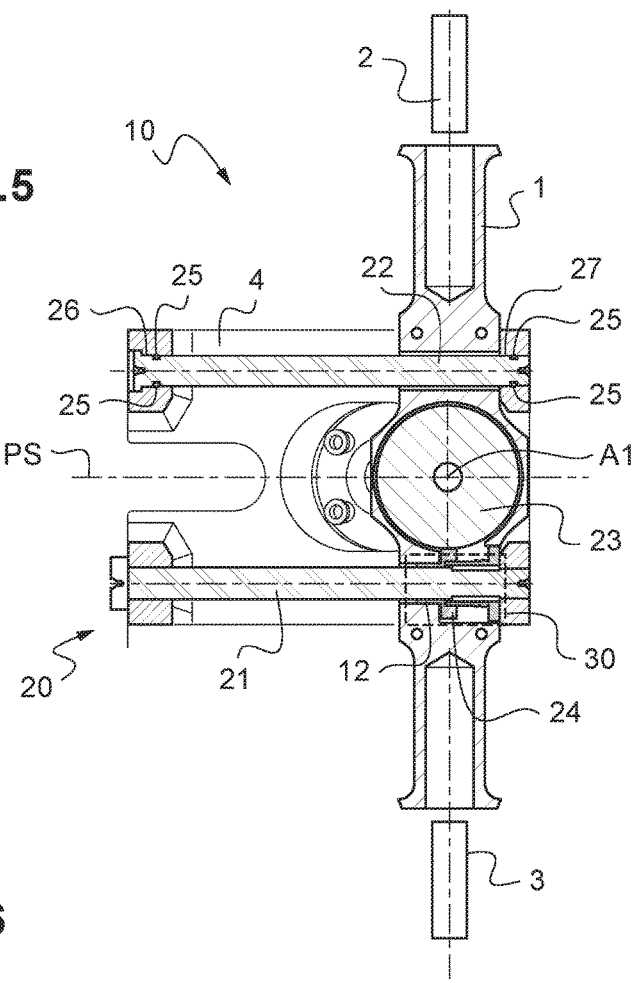
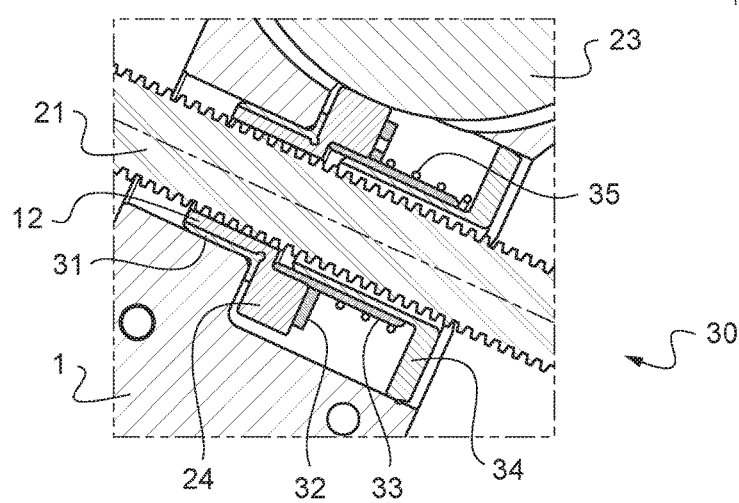

ADJUSTABLE AND ROTARY RUDDER BAR FOR A ROTARY WING AIRCRAFT

CROSS REFERENCE TO RELATED APPLICATION

This application claims priority to French patent application No. FR 15 01599 filed on Jul. 27, 2015, the disclosure of which is incorporated in its entirety by reference herein.

BACKGROUND OF THE INVENTION (1) Field of the Invention

The present invention relates to the field of aircraft flight controls. It relates to a rudder bar that is rotating for controlling yaw movements of an aircraft, and in particular of a rotary wing aircraft, and that is adjustable in position.

(2) Description of Related Art

An aircraft possesses flight controls enabling turning movements of the aircraft to be controlled about three reference axes: the roll, pitching, and yaw axes.

Movements about the roll and pitching axes are conventionally controlled by means of the pilot of the aircraft using a hand-held stick. Movements about the yaw axis are controlled by means of a rudder bar actuated by the pilot's two feet.

For an airplane, these movements are obtained by movable control surfaces situated on the wings and on the horizontal stabilizers of the airplane. For yaw movements, the rudder bar generally controls movement of a rudder located on a generally vertical fin.

Historically, a rudder bar has often been constituted in an airplane by a bar or a plank that can be turned about a vertical axis situated in the middle of the bar. The pilot then positions each foot on a respective end of the bar in order to control yaw movements of the airplane by means of two cables connecting respective ends of the bar to the rudder. Such a rudder bar together with the rudder and the cables thus constitutes a closed system.

Movements of the rudder bar are controlled by movements of the pilot's feet and legs. An action on one end of the bar of the rudder bar is then accompanied by an opposing reaction on the other end of the bar firstly because of the bar itself, and secondly via the cables that move the rudder.

In order to improve the comfort in use of a rudder bar, and in particular in order to match it to the movements made possible by the joints in the pilot's legs and feet, pedals were added to the ends of the bar. Furthermore, such pedals may be hinge-mounted relative to the bar, with respective servo-control links connecting each pedal to the bar and guaranteeing that the pedals remain parallel to each other.

Subsequently, rudder bars have been developed to use two independent pedals, each of which is provided with respective horizontal and transverse turning axes. Such a rudder bar then co-operates with the rudder and with the cables controlling movements of the rudder to form an open system. An action on a pedal is then accompanied by an opposing reaction on the other pedal that is developed solely by means of the cables.

In contrast, for a rotary wing aircraft, movement of the aircraft about the yaw axis is generally not obtained by moving a rudder, but rather by varying the collective pitch of the blades of a yaw anti-torque rotor.

Nevertheless, an architecture identical to that of an airplane was used for installing yaw flight control on rotary wing aircraft, as initially designed by airplane designers. The rudder bar of a rotary wing aircraft thus generally comprises two pedals having respective turning axes about the transverse direction of the aircraft. The pedals are connected to a mechanical transmission linkage in order to transmit collective pitch variation orders for the anti-torque rotor from the rudder bar to the anti-torque rotor.

Nevertheless, acting on a pedal of such a rudder bar does not lead to any reaction on the other pedal being generated by the anti-torque rotor. As a result, mechanical coupling has been added in order to connect together the two pedals of the pedal set. Furthermore, mechanical coupling must also be put into place between the pilot's rudder bar and the rudder bar for the copilot of the aircraft. By way of example, such mechanical coupling may be provided by means of tube and links.

Furthermore, an additional braking function has been added to the rudder bars of certain aircrafts. The braking function makes it possible to act on the pedals to obtain differential braking on one or more wheels of the aircraft landing gear. This braking can be made available on rotary wing aircraft having wheeled landing gear. This braking function serves firstly to slow down and to stop the aircraft on the ground, and secondly to steer it on the ground.

Installing a rudder bar on a rotary wing aircraft is often complex, since the layout of the rudder bar needs to be adapted to each aircraft as a function of the mechanical configuration of the aircraft. In particular, the architecture of the aircraft imposes constraints, such as the positions of frames and longerons, and also the space available under the floor for installing the pedal set. Furthermore, additional constraints are involved with mechanically transferring orders for varying the collective pitch of the blades of the anti-torque rotor and also for varying the positions and the adjustments of the seats for the pilot and for the copilot.

In order to simplify the description and except where specifically contrasted with the term "copilot", the term "pilot" is used in the description below to specify equally well a pilot or indeed a copilot.

Furthermore, in order to be able to adapt to the morphology of pilots, which may be extremely varied, thereby improving the comfort and the piloting position of the pilot, a rudder bar is nowadays often adjustable at least in the longitudinal direction of the aircraft, even though the seat is itself also adjustable in the longitudinal direction.

Specifically, adapting the piloting position of a rotary wing aircraft to the length of a pilot's legs is a major problem when designing rotary wing aircraft. This adaptation is made that much more complex in that it needs to take account in particular of the mechanical coupling that is needed both between the two pedals of one rudder bar and between the rudder bars of the pilot and of the copilot.

By way of example, Document US 2008/0105790 discloses a rudder bar in which the pedals are adjustable in position in the longitudinal direction of the aircraft. That rudder bar has rails for sliding, together with a notched rail for blocking such sliding by means of a locking device. That rudder bar is for use with electrical flight controls of an aircraft and it may include a force return system. That rudder bar also enables the braking function to be used.

Furthermore, Document US 2014/0131523 describes a modular rudder bar suitable for being installed directly on the floor of an airplane. The rudder bar is for electrical flight controls and it too enables the braking function to be used. That rudder bar includes means for adjusting the longitudinal position of each pedal, and also its angle of inclination.

Also known is Document US 2014/0251066, which describes a system having at least one pedal of position that is adjustable in order to adapt to the size of a pilot. By way of example, that system may be used for controlling braking or yaw movements of an aircraft. That system may be adapted to flight controls that are electrical or indeed mechanical. The positions of the pedals in that system can be adjusted both longitudinally and in height. For such height adjustment, a portion of the system, including the longitudinal adjustment of the pedals, is inclined relative to the floor of the aircraft so that the pedals are higher when they are closer to the pilot's seat. As a result, the pedals can be too high for a short pilot when the pedals are moved longitudinally towards the pilot's seat. In contrast, when the pedals are moved longitudinally away from the seat for a tall pilot, the pedals remain close to the floor of the aircraft.

In addition, Document U.S. Pat. No. 2,478,882 describes a rudder bar that is longitudinally adjustable and that comprises two pedals, a main body, and a pedal bar. The pedal bar is connected to the main body via a slideway connection enabling the pedals of the rudder bar to be adjusted longitudinally. The main body is secured to a vertical shaft that is movable in turning and to a set of connecting rods enabling the two pedals to remain parallel to a transverse direction. The rudder bar may also incorporate a braking device activated by pressing on the pedals.

In addition, Document U.S. Pat. No. 4,484,722 describes a device for moving the pedals of a rudder bar and the pedal bar in translation relative to the main body depending on the inclination of the seat for the aircraft pilot. A screw-and-nut system with rotation of the screw being driven by inclining the seat causes the pedals of the rudder bar to move along rails.

Also known is Document U.S. Pat. No. 3,377,881, which describes a rudder bar in which the longitudinal position of the pedals is adjustable. The rudder bar has two connecting rods and two links forming a parallelogram so as to keep the pedals parallel to each other. Furthermore, each pedal is connected to a link by three arms enabling it to be adjusted longitudinally. The adjustment of the position of one pedal is independent of the adjustment of the position of the other pedal.

Finally, the technological background includes Documents US 2013/0019706, FR 2 660 028, and GB 302137.

In addition, for mechanical flight controls of a rotary wing aircraft, a mechanical transmission linkage transmits orders for varying the collective pitch of the blades of the anti-torque rotor from the rudder bar to the anti-torque rotor. The mechanical transmission linkage is generally situated under the floor of the aircraft, a mechanical connection then connecting the rudder bar to said mechanical transmission linkage. Specifically, when the position of the pedal set, or indeed of the pedals, is longitudinally adjustable, a longitudinal opening needs to be made in the floor of the aircraft in order to enable the mechanical connection between the rudder bar and the mechanical transmission linkage to be moved. Consequently, there exists a risk that foreign bodies can penetrate through the opening, which foreign bodies might block the mechanical transmission linkage between the rudder bar and the anti-torque rotor.

BRIEF SUMMARY OF THE INVENTION

An object of the present invention is thus to propose an adjustable and rotary rudder bar for an aircraft and that makes it possible to overcome the above-mentioned limitations so as to be easily transposable from one aircraft to another without special adaptation and in which the longitudinal position of the pedals is adjustable without having recourse to a large longitudinal opening in the floor of the aircraft.

The present invention also seeks to simplify the mechanisms that serve to coordinate the pedals of a rudder bar not only relative to each other, but also between the pedals of the rudder bars of a pilot and of a copilot.

According to the invention, an adjustable and rotary rudder bar for an aircraft comprises:

a pedal bar;

a main body;

two pedals connected to the pedal bar on either side of the main body, the two pedals being positioned at the same distance D from a plane of symmetry PS associated with the main body;

a slider device enabling the pedal bar to slide relative to the main body; and a structure suitable for being fastened to a floor of the aircraft.

The rudder bar of the invention is remarkable in that the rudder bar includes a shaft secured to the main body and having a first axis A1 lying in the plane of symmetry PS, the main body being movable in turning relative to the structure about the first axis A1.

The rudder bar is intended in particular for aircraft flight controls and in particular for the flight controls of rotary wing aircraft, which flight controls may be mechanical or indeed electrical. The first axis A1 is preferably perpendicular to the floor of the aircraft and in a vertical direction of the aircraft. An aircraft is characterized by three reference directions, a longitudinal direction extending from the rear to the front of the aircraft; a vertical direction extending upwards perpendicularly to the longitudinal direction, and a transverse direction extending from left to right perpendicularly to the longitudinal and vertical directions. The longitudinal direction is the roll axis of the aircraft, the transverse direction is its pitching axis, and the vertical direction is its yaw axis.

Advantageously, the adjustable and rotary rudder bar of the invention is very easy to install on an aircraft using its first turning axis A1 which is vertical, unlike the rudder bars often used nowadays in which each pedal turns only about an axis that is horizontal.

A pedal is preferably positioned at each end of the pedal bar, the pedal bar being substantially symmetrical relative to the plane of symmetry PS and having two ends. The pilot of a rotary wing aircraft can thus use the rudder bar of the invention to control variation of the collective pitch of the blades of an anti-torque rotor of the aircraft, and consequently to control movement of the aircraft about its yaw axis. The pilot then positions each foot on a respective pedal in order to move the pedal bar. The rudder bar of the invention can also be used in an airplane in order to control the movement of a rudder giving rise to movements in yaw of the airplane.

The rudder bar of the invention is fastened via its structure to a floor of the aircraft in front of the seat for a pilot in the longitudinal direction of the aircraft. The structure of the rudder bar may be fastened to the floor by fastener means, e.g. bolts or rivets.

The slider device enables the pedal bar to slide relative to the main body in order to adjust the position of the pedals relative to the pilot's seat, and thus be adapted to the length of the pilot's legs. The sliding direction of the pedal bar relative to the main body is parallel to the plane of symmetry PS.

First means for adjusting the position of the pilot in the cockpit of the aircraft comprise the seat which is adjustable in at least the longitudinal direction of the aircraft and possibly also in its vertical direction. Such first adjustment means serve in particular to adjust the position of the pilot so that the pilot's eyes are situated in a preferred position in the aircraft, giving the pilot a good view of the environment outside the aircraft and also of the control screens of the aircraft. The first adjustment means also enable the position of the pilot to be adjusted relative to flight control levers, which are in fixed position in the cockpit.

The slider device of the rudder bar of the invention then constitutes second means for adjusting the position of the pilot in the cockpit of the aircraft enabling the position of the pedals of the rudder bar to be adjusted to the length of the pilot's legs. The slider device is irreversible, i.e. action of the pilot's feet on the pedals of the rudder bar does not cause the pedal bar to slide relative to the main body.

Specifically, once the positions of the pedals of the rudder bar have been adjusted by means of the slider device, no movement is possible between the pedal bar and the main body.

In contrast, since the main body is movable in turning relative to the structure about the first axis A1, action of the pilot's feet on the pedals causes the pedal bar to turn together with the main body relative to the structure, and consequently relative to the floor of the aircraft, about the first axis A1. The turning movement of the main body relative to the structure and to the floor of the aircraft about this first axis A1 is independent of the position of the pedal bar relative to the main body in the sliding direction.

Advantageously, the rudder bar of the invention makes it possible to dissociate the sliding movements of the pedal bar for adjusting the position of the pedals from the turning movements of the main body for controlling the yaw movements of the aircraft.

As a result, the main body moves in turning only about the first axis A1 relative to the structure of the pedal set. This structure is stationary relative to the floor of the aircraft and thus has only one substantially circular opening to enable the shaft of the rudder bar to turn. Such a substantially circular opening may also be present in the floor.

The rudder bar of the invention thus avoids having a longitudinal opening present in the structure of the rudder bar and/or in the floor in order to accommodate the usual sliding of an entire rudder bar having a substantially vertical turning axis. Consequently, the rudder bar of the invention improves the safety of this rudder controlling function by eliminating any risk of the system for controlling yaw movements of the aircraft becoming blocked as a result of foreign bodies intruding via the longitudinal opening.

Furthermore, the first pivot axis A1 of the rudder bar is not directly connected to the pedal bar or to the pedals, unlike a conventional rudder bar having a vertical turning axis, but is instead connected to the main body. For such a conventional pedal set, the vertical turning axis is generally situated in the middle of the bar connecting together the two pedals and it slides with the pedals. In the rudder bar of the invention, the pedal bar and the pedals can move in sliding relative to the first axis A1 when adjusting the position of the pedal set. Consequently, the distance between the first axis A1 and each pedal differs depending firstly on the position of the first axis A1 relative to the main body, and secondly on the adjustment position of the pedal bar.

In addition, the position of the pedal bar is adjustable between a rear adjustment position, which is the position closest to the seat of the aircraft, and a front adjustment position, which is the position furthest from the seat. The first axis A1 is preferably positioned closer to the rear position than to the front position.

When adjusting the pedal bar close to the rear position for each pedal of the rudder bar such a position for the first axis A1 advantageously makes it possible to describe a circular arc about the first axis A1 that is of radius that is smaller than when the pedal bar is close to the front position.

Thus, the movements followed by the pedals adapt to the length of the pilot's legs and to the movements made possible by the joints of those legs. Specifically, it is easier for a pilot with long legs to move the feet over circular arcs of greater radius, the pedal bar then being in a position close to the front position. Likewise, it is easier for a pilot with short legs to move over circular arcs of smaller radius, the pedal bar being in a position close to the rear position.

By way of example, the sliding stroke of the pedal bar is arranged in equal fractions on either side of the first axis A1. The first axis A1 is then positioned at a distance equal to half the sliding stroke between the rear position and the front position.

Furthermore, the sliding of the pedal bar relative to the main body may take place along a sliding direction that lies in a first plane P1 that is substantially perpendicular to the plane of symmetry PS and parallel to the floor of the aircraft. This first plane P1 is connected to the structure of the pedal set.

Nevertheless, this sliding direction may equally well be inclined relative to the floor of the aircraft in order to modify also the vertical position of the pedals relative to the floor of the aircraft when adjusting the position of the pedals. This sliding direction is preferably inclined from the rear towards the front of the aircraft, i.e. the pedals move further away from the floor when the pedal bar slides towards the front of the aircraft away from the pilot's seat.

Thus, the distance between the pedals and the floor is smaller when the pedal bar is in its rear adjustment position than when the pedal bar is in its front adjustment position. Specifically, the pedals are closer to the floor of the aircraft in the rear adjustment position than in the front adjustment position.

This sliding direction is then situated in a second plane P2 that forms an angle β relative to the first plane P1. The second plane P2 is connected to the main body.

This inclined sliding direction for the pedal bar makes it possible in particular to adapt to movements of the pilot's seat in the aircraft. Specifically, depending on the aircraft, the pilot's seat may move simultaneously both longitudinally and vertically.

The inclined direction can then advantageously enable each of the pilot's feet to conserve good mobility by maintaining as constant as possible the angle between the pilot's tibia and the longitudinal axis of the pedal, regardless of the position of the rudder bar about the first axis A1, and also as a function of the adjustment height of the seat and of the length of the pilot's leg.

In order to improve pilot comfort, and in particular in order to enable each pedal to adapt automatically to the angular position of the pedal bar about the first axis A1, each pedal may be movable in turning about a second axis A2 substantially parallel to the first axis A1.

Furthermore, in order to ensure that the positions of the two pedals about their second axes A2 are linked so that the two pedals remain parallel to each other, the rudder bar may include a servo-control system connecting together the pedals. The positions of the pedals can thus be adapted about their second axes A2 to the position of the pilot's feet, regardless of the angular position of the main body about the first axis A1.

By way of example, the servo-control system may be constituted by two servo-control links connecting each pedal to the pedal bar in known manner.

The rudder bar of the invention may also include a pivot connection about the second axis A2 using a respective elastomer bearing between the pedal bar and each pedal. As a result, each pedal is movable about its second axis A2 with a stroke that is limited by the elastomer bearing, but that is sufficient, given the angular stroke of the pedal bar. Furthermore, the stiffness in twisting of the elastomer bearing imposes a small amount of force opposing turning movement of the pedal about its second axis A2, thereby enabling the pedal to recenter itself to an initial position relative to the pedal bar as soon as the pilot's foot is removed from the pedal. Since this opposing force is small, it does not oppose the actions of the pilot's foot.

Advantageously, the position of each pedal can thus be adapted about its second axis A2 to the position of the pilot's foot regardless of the angular position of the main body about the first axis A1, and can enable it to return to the initial position as soon as the pilot's foot is removed from the pedal. In addition, the pedals are not constrained to be parallel to each other and the servo-control links that are conventionally used are omitted.

The use of such a pivot connection with an elastomer bearing thus advantageously makes it possible to avoid using bulky devices for making the pivot connection.

Each pedal may also be movable in turning about a third axis A3, the third axis A3 being substantially perpendicular to the first axis A1 and to the plane of symmetry PS, in order to improve the comfort of the pilot of the aircraft. The angle between a pilot's tibia and foot can thus be adjusted to the optimum position for each pilot.

Furthermore, the rudder bar of the invention may include a connecting rod and a crank in order to transform the turning movement of the shaft into movement in translation of the connecting rod. For this purpose, the crank is secured to the shaft and the connecting rod is connected to the crank via a pivot connection or via a ball joint. The connecting rod is connected to a mechanical control linkage so as to control variation in the pitch of the blades of the anti-torque rotor of a rotary wing aircraft or so as to control the movement of a rudder of an airplane, when mechanical flight controls are used.

The rudder bar may also include at least one bearing in order to guide the shaft in turning relative to the structure of the pedal set. A bearing may optionally be positioned between the shaft and the floor of the aircraft. By way of example, such a bearing may be of the ball bearing type.

Such a bearing may also include one or more position sensors serving to define accurately the angular position of the shaft about the first axis A1. When electrical flight controls are used, such a bearing having sensors can replace the crank and connecting rod system of the rudder bar in order to pilot yaw movements of the aircraft via an electrical control system.

It should be observed that the structure of the rudder bar of the invention may be dissociated from the rudder bar and formed by the floor or by a portion of the floor of the aircraft. The rudder bar is then connected directly to the floor, e.g. via one or two bearings positioned in the thickness of the floor.

In addition, the slider device of the rudder bar of the invention is irreversible. It may include locking means that are actuated once the position of the pedals has been adjusted. Preferably, the slider device provides such irreversibility merely by the way it operates.

For example, the slider device may include at least one lead screw connected to the main body and at least one nut connected to the pedal bar. Each nut is connected to a lead screw via a helical connection. As a result, turning at least one nut relative to the lead screw causes the nut to move in translation along the lead screw, and consequently causes the pedal bar to slide relative to the main body.

In a first embodiment of the invention, the slider device has a manual control for turning each nut and enabling the pedal bar to slide relative to the main body. Each nut then has a pivot connection with the pedal bar and each lead screw is secured to the main body. It is then not possible for any of the lead screws to move relative to the main body.

By way of example, the manual control may comprise an adjustment knob and a toothed wheel that are secured to each other and connected to the pedal bar via pivot connections, together with a pinion connected to the pedal bar via a pivot connection. The nut is secured to the pinion and the toothed wheel meshes with the pinion, thereby driving the nut in rotation.

The irreversibility of the slider device can then be obtained by the teeth of the toothed wheel and of the pinion, and also by the pitch of the lead screw. For example, the thread connecting the nut with the lead screw may be trapezoidal and its pitch may be small, being about 2 millimeters (mm). Furthermore, the toothed wheel and the pinion have helical teeth with a large helix angle of about 45°.

In a second embodiment of the invention, the slider device includes an electrical control driving each lead screw in rotation and enabling the pedal bar to slide relative to the main body by means of the nut. Under such circumstances, each nut is secured to the pedal bar while the lead screw is driven in rotation by an electric motor and is connected to the main body via a pivot connection. Irreversibility is then obtained mainly by the thread of the lead screw.

In a variant of this second embodiment, an electric motor acts like the manual control in the first embodiment to rotate a nut via a toothed wheel and a pinion in order to limit the force that needs to be delivered by the electric motor. Irreversibility is then obtained by appropriately selecting the teeth of the toothed wheel and of the pinion and also the thread of the lead screw.

In a third embodiment of the invention, the rudder bar may also include a servo-control associated with each pedal, each pedal being movable in turning about a third axis A3. Each servo-control is positioned close to a pedal and is connected to the pedal bar so that an action of a pilot's foot on the pedal about the third axis A3 acts on the servo-control. Each servo-control is connected to a braking system for braking at least one wheel of landing gear of the aircraft.

The rudder bar thus enables the braking of the aircraft on the ground to be controlled by means of wheels of its landing gear. Furthermore, since each pedal controls a servo-control in independent manner, the rudder bar also enables the aircraft to be steered on the ground by pressing in differential manner on the pedals so as to obtain different braking on different wheels of the landing gear.

For this third embodiment, the slider device may be controlled manually or electrically.

Furthermore, the slider device includes at least one guide bar substantially parallel to the lead screw and connected to the main body. Each guide bar serves firstly to take up the majority of the forces generated by the actions of the pilot's feet, and secondly to provide guidance in sliding for the pedal bar relative to the main body. Each lead screw takes up the remaining portion of the forces and also provides a portion of the guidance.

Each guide bar and each lead screw must be very accurately parallel in order to avoid high levels of friction, which could subsequently give rise to friction forces in the flight control system. For this purpose, each guide bar is flexibly mounted in order to compensate for departures from such a parallel configuration.

The slider device may also include an anti-friction bearing providing a sliding pivot connection between the guide bar and the main body in order to reduce sliding forces on the guide bar and consequently reduce friction forces in the flight control system.

Preferably, the slider device of the rudder bar of the invention has a single lead screw and a single guide bar.

In a variant of the first embodiment of the rudder bar of the invention, the nut may be secured to the main body and stationary relative to the main body both in rotation and in translation. The lead screw and the guide bar are then connected to the pedal bar. The guide bar is secured to the pedal bar while the lead screw is connected to the pedal bar via a pivot connection. The adjustment knob then acts via the toothed wheel to drive rotation of the lead screw and consequently movement in translation of the pedal bar relative to the nut and the main body.

Likewise, a variant of the second embodiment may include a nut secured to the main body, the lead screw and the guide bar being connected to the pedal bar.

Furthermore, the slider device may include at least one backlash takeup device associated with the lead screw in order to limit backlash in its connection with the nut of the pedal bar, and consequently ensure that control over yaw movements of the aircraft by the rudder bar is accurate and reactive.

The invention also provides an aircraft having a seat for a pilot of the aircraft and a rudder bar as described above. The rudder bar is arranged in front of the seat and is configured to be moved longitudinally relative to the seat.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 5 is a view of the slider device of the pedal set;

FIG. 6 is a view of the backlash takeup device of the slider device;

DETAILED DESCRIPTION OF THE INVENTION

Elements shown in more than one of the figures are given the same references in each of them.

Figure 1:
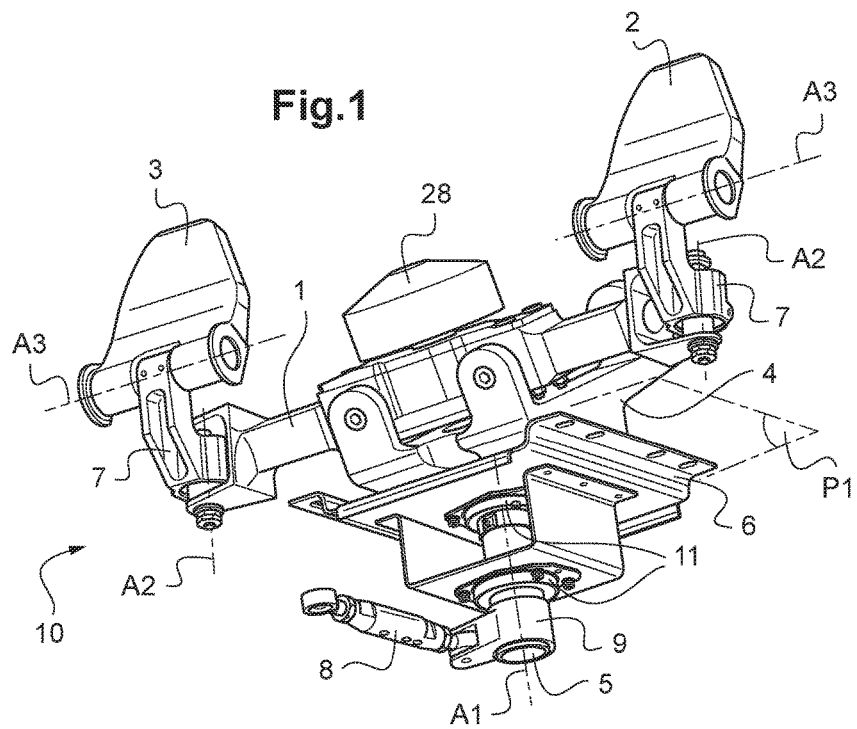
FIGS. 1 and 2 show a first embodiment of a rudder bar of the invention.
Figure 2:
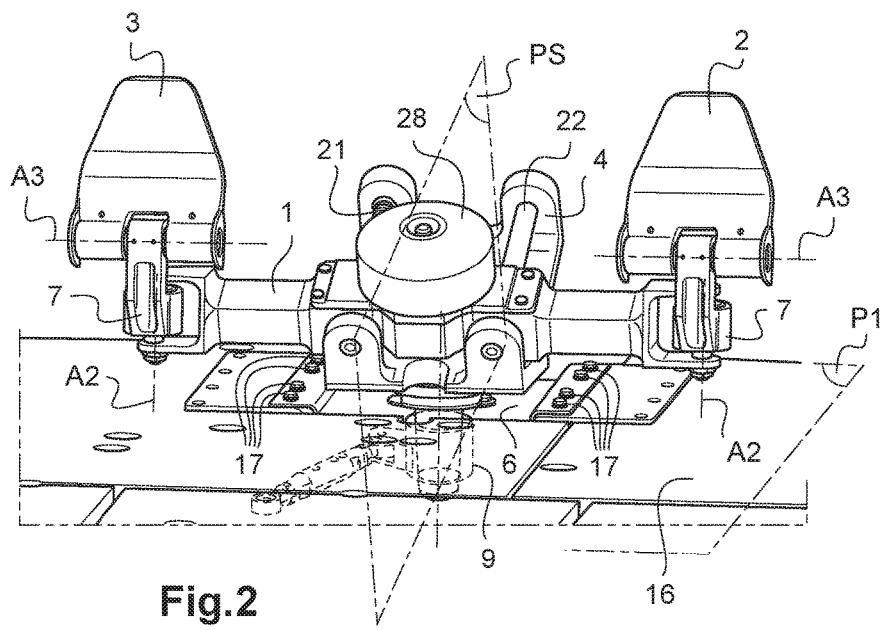
Figure 3:
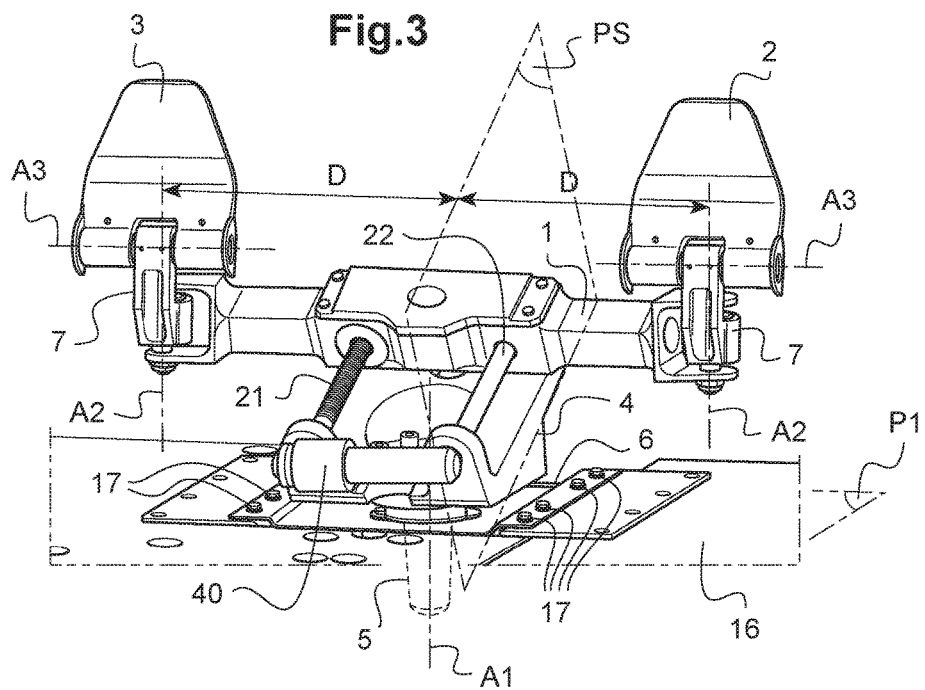
FIG. 3 shows a second embodiment of a rudder bar of the invention.

FIGS. 1 and 2 show a first embodiment of a rudder bar 10 for an aircraft, and in particular for a rotary wing aircraft. The rudder bar 10 serves to control the yaw movements of the aircraft by varying the collective pitch of blades of an anti-torque rotor of the aircraft. This pitch variation control is performed by means of a mechanical control linkage connected to a connecting rod 8 of the rudder bar 10. A second embodiment of a rudder bar 10 is shown in FIG. 3.

The rudder bar 10 comprises a pedal bar 1, a main body 4, two pedals 2 and 3, a slider device 20, a shaft 5, two ball bearings 11, a structure 6, a connecting rod 8, and a crank 9.

Each pedal 2, 3 is connected to one end of the pedal bar 1 via a connection support 7. Each pedal 2, 3 is positioned at the same distance D from a plane of symmetry PS associated with the main body 4.

The shaft 5 is secured to the main body 4 and has a first axis A1, which lies in the plane of symmetry PS.

The structure 6 is fastened to a floor 16 of the aircraft by bolts 17. The floor 16 is flat and constitutes a first plane P1. The two ball bearings 11 serve to guide the shaft 5 in turning relative to the structure 6. Thus, the assembly formed by the main body 4 and the shaft 5 is movable in turning relative to the structure 6 about the first axis A1. The first axis A1 is perpendicular to the floor 16 of the aircraft and is substantially parallel to a vertical direction of the aircraft.

The slider device 20 enables the pedal bar 1 to slide relative to the main body 4 so as to adjust the position of the pedals 2, 3 relative to the seat 18 of the pilot of the aircraft. As a result, the pedal bar 1 and the pedals 2, 3 can slide relative to the main body 4. Furthermore, the pedal bar 1 and the pedals 2, accompany the main body 4 when it moves in turning about the first axis A1.

The slider device 20 is irreversible, such that once the position of the pedals 2, 3 has been adjusted, no movement is possible between the pedal bar 1 and the main body 4 under the action of the pilot's feet on the pedals 2, 3.

Thus, an action of the feet of the pilot of the aircraft on the pedals 2, 3 causes the pedals 2, 3 to move in turning about the first axis A1, and consequently causes the main body 4 to move in turning about the first axis A1.

The slider device 20 in the first embodiment of the rudder bar 10 is shown in detail in FIG. 5. The slider device 20 comprises a lead screw 21, a guide bar 22 substantially parallel to the lead screw 21, a toothed wheel 23, a pinion 24, and a nut 12.

The lead screw 21 is secured to the main body 4 and is thus stationary relative to the main body 4. The guide bar 22 is connected to the main body 4 via a pivot connection formed more precisely by a pivot connection 26 at one end of the guide bar 22 and by a sliding pivot connection 27 at the other end of the guide bar 22. The guide bar 22 is connected to the pedal bar 1 via a sliding pivot connection 29.

The toothed wheel 23 and the pinion 24 are connected to the pedal bar 1 via respective pivot connections. The toothed wheel 23 is constituted by a gear having helical teeth meshing with the pinion 24. The nut 12 is secured to the pinion 24 and thus constrained to rotate with the pinion 24. The nut 12 is connected to the pedal bar 1 by a pivot connection, and it is connected to the lead screw 21 via a helical connection formed by the screw thread of the lead screw 21 and of the nut 12.

The screw thread of the lead screw 21 is trapezoidal and its pitch is about 2 mm, thereby contributing to the irreversibility of the sliding of the pedal bar 1, and the helical teeth of the toothed wheel 23 and of the pinion 24 are likewise trapezoidal with pitch of about 2 mm.

The slider device 20 also has an adjustment knob 28 that is visible in FIGS. 1 and 2 and that is secured to the toothed wheel 23. Thus, turning the adjustment knob 28 causes the toothed wheel 23 to turn, thereby turning the pinion 24 and the nut 12.

Consequently, turning the nut 12 relative to the main body 4 causes the nut 12 to move in translation relative to the lead screw 21, and thus causes the pedal bar 1 to slide relative to the main body 4.

The guide bar 22 and the lead screw 21 need to be parallel in order to enable the pedal bar 1 to slide while limiting opposing forces. In order to compensate for departures from such parallelism, O-rings 25 are positioned between the guide bar 22 and the main body 4, enabling the guide bar 22 to move angularly a little by deforming the O-rings 25.

Furthermore, the slider device 20 includes backlash takeup device 30 at the connection between the lead screw 21 and the pedal bar 1. The backlash takeup device 30, shown in FIG. 6, serves to eliminate backlash in this connection, thereby ensuring that control over yaw movement of the aircraft by means of the rudder bar 10 is accurate and reactive.

The backlash takeup device 30 comprise a shouldered bearing 31 and an abutment 32 of anti-friction material, together with a ring 33, a plug 34, and a spring 35. The nut 12 is guided in turning in the pedal bar 1 firstly via the shouldered bearing 31 and secondly via the ring 33 and the plug 34. The spring 35 keeps the nut 12 bearing against the shouldered bearing 31. The abutment 32 is positioned between the rotary nut 12 and the spring 35, which is stationary relative to the pedal bar 1. The ring 33 and the plug 34 are also stationary relative to the pedal bar 1.

Thus, in a first direction of turning, the spring 35, the toothed wheel 33, and the lead screw 21 exert forces on the nut 12 in the same direction. In an opposite, second direction of turning, the lead screw 21 and the toothed wheel 23 exert forces opposite to the force from the spring 35. As a result, during adjustment stages, forces are always applied firstly in the threaded connection between the nut 12 and the lead screw 21, and secondly in the meshing connection between the toothed wheel 23 and the pinion 24. Furthermore, when not in adjustment stages, backlash in the threaded connection and in the meshing connection is likewise taken up in the same direction as the forces applied by the pilot on the rudder bar 10 via the pedals 2, 3.

The crank 9 is secured to the shaft 5, and the connecting rod 8 is connected to the crank 9 via a ball joint. Thus, the connecting rod 8 and the crank 9 serve to transform turning movement of the shaft 5 into movement in translation of the connecting rod 8. Thus, action by the feet of the pilot of the aircraft on the pedals 2, 3 causes the pedals 2, 3 to turn together with the shaft 5 about the first axis A1, and consequently causes the connecting rod 8 to move in translation. The connecting rod 8 is connected to a mechanical control linkage in order to control variation in the collective pitch of the blades of the anti-torque rotor of the aircraft. This first embodiment of the rudder bar 10 is for use with mechanical flight controls of the aircraft.

Figure 8:
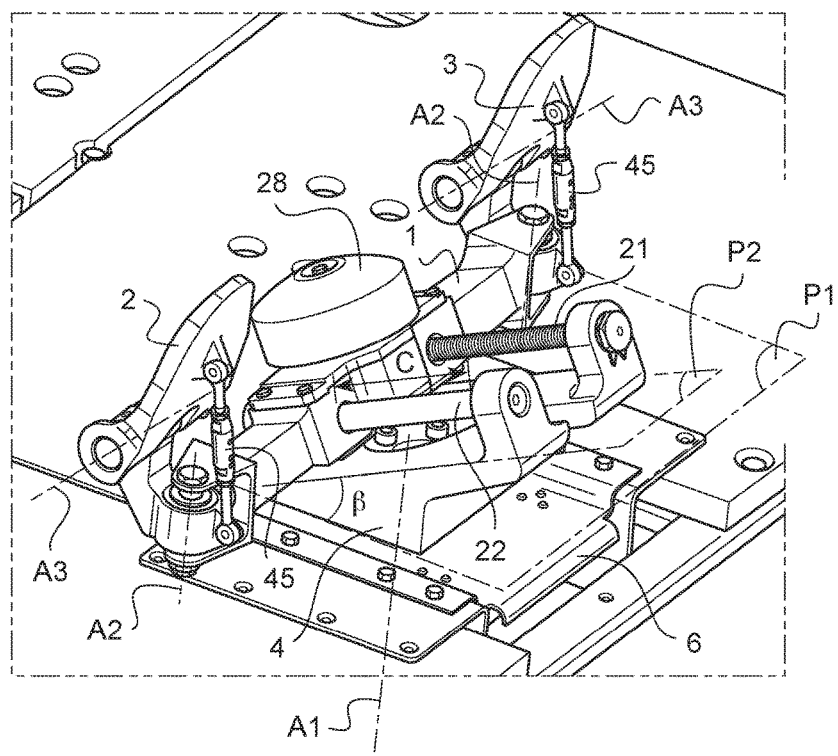
FIG. 8 shows a third embodiment of a rudder bar of the invention.

In FIGS. 1, 2, and 8, the rudder bar 10 is shown with the pedal bar 1 in its rear adjustment position, and in FIG. 3 it is shown with the pedal bar 1 in its front adjustment position. The rear position is the position in which the pedals 2, 3 are closest to the seat 18, whereas the front position is the position in which the pedals 2, 3 are furthest from the seat 18.

Figure 4:
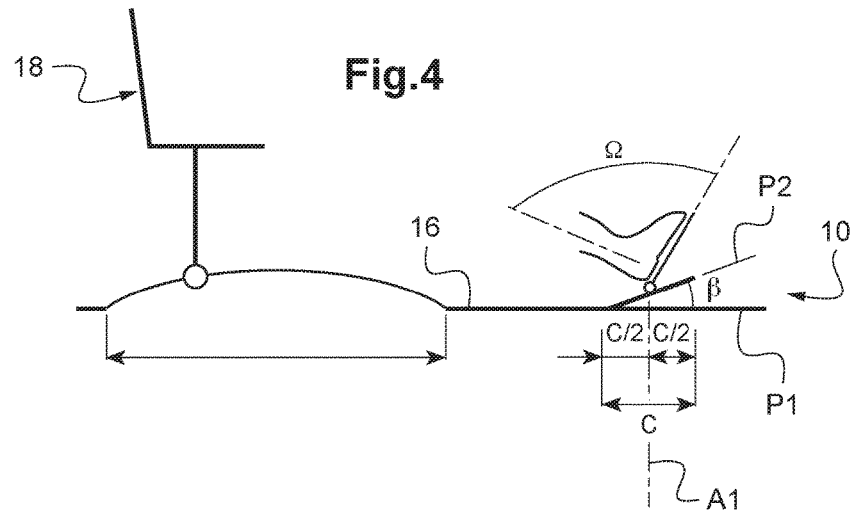
FIG. 4 shows the dynamics of adjusting a sheet of the aircraft.

FIG. 4 is a simplified view of the seat 18 for the pilot of the aircraft and of the rudder bar 10. In FIGS. 1 to 4, it can be seen that the first axis A1 is situated halfway between the rear position and the front position of the pedal bar 1. Specifically, for a total sliding stroke C of the pedal bar 1, the first axis A1 is situated at a distance equal to half the total stroke C (C/2) from the rear position and from the front position.

Thus, the rudder bar 10 can be adapted to the length and to the mobility of the pilot's legs and also to the position of the seat 18. Specifically, the circular arc described by each pedal 2, 3 about the first axis A1 when the pedal bar 1 is close to the rear position is of radius smaller than when the pedal bar is close to the front position.

In addition, the sliding of the pedal bar 1 relative to the main body 4 takes place in an inclined second plane P2 that forms an angle β with the first plane P1, as can be seen in FIGS. 4 and 8. In this second plane P2, the pedals 2, 3 are moved vertically away from the floor 16 of the aircraft 50 when the pedal bar 1 slides towards the front of the aircraft, i.e. towards the front adjustment position.

This direction inclined at the angle β enables each of the pilot's feet to conserve a substantially constant angle Ω between the tibia of the pilot's leg and the longitudinal axis of the pedal, regardless of the position of the pilot's feet or of the morphology of the pilot. This inclined sliding direction for the pedal bar 1 is particularly adapted to a seat for which position adjustment takes place simultaneously both longitudinally and vertically, as shown in FIG. 4.

Figure 7:
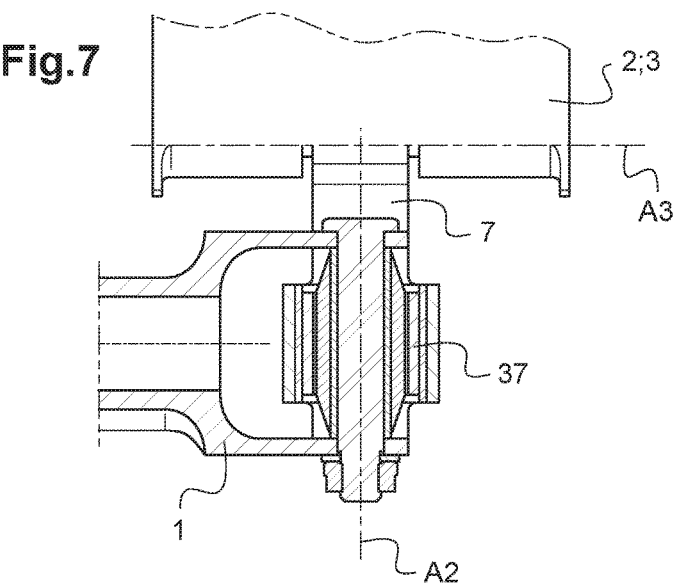
FIG. 7 is a detail view of a pivot connection with an elastomer bearing of one pedal.

The connection support 7 is connected to the pedal bar 1 by a pivot connection with an elastomer bearing 37 on a second axis A2 substantially parallel to the first axis A1. One such pivot connection with an elastomer bearing 37 is shown in FIG. 7. Each of the pedals 2, 3 and the support 7 are movable in turning about the second axis A2 with a stroke that is limited by the elastomer bearing 37. This limited stroke is sufficient for each pedal 2, 3 to adapt automatically to the angular position of the pedal bar 1 about the first axis A1. Furthermore, the twisting stiffness of the elastomer bearing 37 imparts a weak opposing force serving to recenter the pedal 2, 3 on the pedal bar 1 as soon as the pilot takes a foot of a pedal 2 or 3.

Each pedal 2, 3 is also movable in turning about a third axis A3 relative to the connection support 7. This third axis A3 is substantially perpendicular to the first axis A1 and to the plane of symmetry PS, whenever no action is exerted on the pedals 2, 3 by a pilot. This freedom to move in turning about the third axis A3 enables the angle of inclination of each pedal 2, 3 to be adjusted in order to improve pilot comfort.

In the second embodiment of the rudder bar 10 shown in FIG. 3, the slider device 20 includes an electric motor 40 for driving the lead screw 21 in turning, possibly via rotary speed reduction gearing incorporating in the electric motor 40. In this embodiment, the nut 12 is secured to the pedal bar 1 and the lead screw 21 is connected to the main body 4 via a pivot connection.

In this second embodiment, the rudder bar 10 does not have a connecting rod 8 or a crank 9. The ball bearings 11 include position sensors accurately defining the angular position of the shaft 5 about the first axis A1. In this second embodiment, the rudder bar 10 is for use with electrical flight controls of the aircraft. The angular position of the shaft 5 defined by these sensors then enables yaw movements of the aircraft to be piloted via an electrical control system.

A third embodiment of the rudder bar 10 is shown in FIG. 8. The rudder bar 10 has two servo-controls 45. Each servo-control 45 is connected to a respective pedal 2, 3, with each pedal 2, 3 being movable in turning about the third axis A3. Each servo-control 45 is also connected to a connection support 7 by a pivot connection. Each servo-control 45 is connected to a braking system for braking at least one wheel of landing gear of the aircraft. As a result, action of the pilot's foot on a pedal 2, 3 about the third axis A3 acts on a servo-control 45 for the purpose of controlling braking of the aircraft on the ground by means of wheels of its landing gear.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An adjustable and rotary rudder bar for an aircraft, the rudder bar comprising:
   a pedal bar;
   a main body;
   two pedals connected to the pedal bar on either side of the main body, the two pedals being positioned at the same distance D from a plane of symmetry (PS) associated with the main body;
   a slider device enabling the pedal bar to slide relative to the main body;
   a structure suitable for being fastened to a floor of the aircraft; and
   a shaft having a first axis (A1) lying in the plane of symmetry (PS), the shaft being secured to the main body, which is movable in turning relative to the structure about the first axis (A1);
   wherein the structure possesses a first plane (P1) substantially perpendicular to the plane of symmetry (PS) and suitable for being substantially parallel to the floor of the aircraft, and the slider device is inclined relative to the structure so that the pedal bar slides relative to the main body in a second plane (P2) forming an angle β with the first plane (P1) so that the vertical position of the pedals relative to the floor is modified during the sliding of the pedals, the pedals moving vertically away from the floor when the pedal bar slides towards the front of the rudder bar going away from the seat of a pilot of the aircraft.

2. The rudder bar according to claim 1, wherein the slider device comprises at least one lead screw connected to the main body, at least one guide bar substantially parallel to each lead screw, and at least one nut connected to the pedal bar, each guide bar having a sliding pivot connection with the pedal bar and a pivot connection with each main body, and each nut being connected to a lead screw via a helical connection.

3. The rudder bar according to claim 2, wherein the slider device includes a manual control, an adjustment knob driving the nut in turning relative to a lead screw and enabling the pedal bar to slide relative to the main body, each lead screw being secured to the main body and each nut being connected to the pedal bar by a pivot connection.

4. The rudder bar according to claim 2, wherein the slider device includes an electrical control, an electric motor driving the lead screw in turning and enabling the pedal bar to slide relative to the main body, each lead screw being connected to the main body by a pivot connection, and each nut being secured to the pedal bar.

5. The rudder bar according to claim 2, wherein the slider device includes at least one backlash takeup device associated with a lead screw.

6. The rudder bar according to claim 1, wherein each pedal is movable in turning about a second axis (A2) substantially parallel to the first axis (A1).

7. The rudder bar according to claim 6, wherein the rudder bar includes a pivot connection with an elastomer bearing about the second axis (A2) between the pedal bar and each pedal so that the position of each pedal is suitable for being adapted about the second axis (A2) to the position of a foot of a pilot of the aircraft regardless of the angular position of the main body about the first axis (A1).

8. The rudder bar according to claim 6, wherein the rudder bar includes a servo-control system connecting the pedals together and to the pedal bar so that the position of each pedal is suitable for being adapted about the second axis (A2) to the position of a foot of a pilot of the aircraft regardless of the angular position of the main body about the first axis (A1), the pedals then being parallel to each other.

9. The rudder bar according to claim 1, wherein each pedal is movable in turning about a third axis (A3), the third axis (A3) being substantially perpendicular to the first axis (A1) and to the plane of symmetry (PS), in order to improve the comfort of a pilot of the aircraft.

10. The rudder bar according to claim 1, wherein each pedal is movable in turning about a third axis (A3), the third axis (A3) being substantially perpendicular to the first axis (A1) and to the plane of symmetry (PS), and the rudder bar includes a servo-control for each pedal, each servo-control being positioned in the proximity of a pedal and being connected to the pedal bar so that an action of a pilot's foot on a pedal about the third axis (A3) acts on the servo-control, each servo-control being suitable for being connected to a braking system for braking at least one wheel of landing gear of the aircraft.

11. The rudder bar according to claim 1, wherein the rudder bar includes at least one ball bearing for providing rotary guidance between the shaft and the structure, at least one ball bearing including position sensors suitable for defining the angular position of the shaft.

12. An aircraft, including a seat for a pilot of the aircraft together with the rudder bar according to claim 1.

13. An adjustable and rotary rudder bar for an aircraft, the rudder bar comprising:
   a pedal bar;
   a main body;
   two pedals connected to the pedal bar on either side of the main body, the two pedals being positioned at the same distance D from a plane of symmetry (PS) associated with the main body;
   a slider device enabling the pedal bar to slide relative to the main body;
   a structure suitable for being fastened to a floor of the aircraft; and
   a shaft having a first axis (A1) lying in the plane of symmetry (PS), the shaft being secured to the main body, which is movable in turning relative to the structure about the first axis (A1);
   wherein the slider device comprises at least one lead screw connected to the main body, at least one guide bar substantially parallel to each lead screw, and at least one nut connected to the pedal bar, and at least one backlash takeup device associated with a lead screw, each guide bar having a sliding pivot connection with the pedal bar and a pivot connection with each main body, and each nut being connected to a lead screw via a helical connection, the backlash takeup device comprising a shouldered bearing and an abutment of anti-friction material together with a ring, a plug, and a spring, the nut is guided in turning in the pedal bar firstly by means of the shouldered bearing and secondly by means of the ring and the plug, the spring keeping the nut bearing against the shouldered bearing, and the abutment being positioned between the nut and the spring.

* * * * *